(12) United States Patent
Garcia et al.

(10) Patent No.: US 6,238,015 B1
(45) Date of Patent: May 29, 2001

(54) ANTI-LOCK BRAKE SENSOR HOLDER

(76) Inventors: Francisco J. Garcia, 342 Tudor Cir., Apartment 247; Leo J. Wenstrup, 3668 Arbutus Trail, both of Portage, MI (US) 49024

( * ) Notice: Subject to any disclaimer, the term of this patent is extended or adjusted under 35 U.S.C. 154(b) by 0 days.

(21) Appl. No.: 09/224,842

(22) Filed: Dec. 31, 1998

(51) Int. Cl.$^7$ .................................................. B60T 8/32
(52) U.S. Cl. .................................... 303/121; 188/181 R
(58) Field of Search ............................. 303/121, 113.1, 303/112; 188/181 R, 181 A; 73/121–132, 862.631; 180/253

(56) References Cited

U.S. PATENT DOCUMENTS

| 3,887,046 | | 6/1975 | Bueler . |
| 4,037,690 | * | 7/1977 | Fisher et al. ................ 188/181 R |
| 4,132,293 | * | 1/1979 | Jovick ........................ 188/181 R |
| 4,633,966 | * | 1/1987 | Fotheringham ............ 188/181 R X |
| 4,637,488 | * | 1/1987 | Fotheringham et al. .... 188/181 R X |
| 5,148,104 | * | 9/1992 | Ishikawa .................... 188/181 R X |
| 5,333,948 | | 8/1994 | Austin et al. . |
| 5,704,692 | * | 1/1998 | Purdy et al. ................ 188/181 R X |
| 5,733,044 | | 3/1998 | Rose et al. . |
| 5,763,787 | | 6/1998 | Gravel et al. . |

* cited by examiner

*Primary Examiner*—Robert J. Oberleitner
*Assistant Examiner*—Melanie Talavera
(74) *Attorney, Agent, or Firm*—Liniak, Berenato Longacre & White

(57) ABSTRACT

A two-piece anti-lock brake sensor bracket has a first bracket member or mounting bracket which is welded to an axle housing adjacent a wheel hub. A second bracket member which is a sensor holder is snap-fit onto the first bracket member. An anti-lock brake sensor is mounted in the second bracket member. A snap-fit design for attaching the two bracket members also provides a quick-release, allowing the second bracket member to be detached from the first bracket member. The sensor holder has protrusions which engage with apertures in the mounting bracket. This two piece design can accommodate variations in tone wheel diameter and position with only minor modifications. Additionally, this design is "universal" in that the same type of two-piece bracket assembly works with reduced envelope brakes. Therefore, manufacturing and assembly costs are reduced.

6 Claims, 4 Drawing Sheets

Fig. 2A
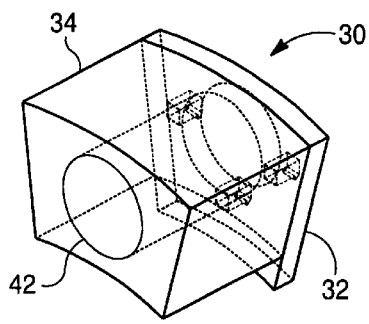
Fig. 2B
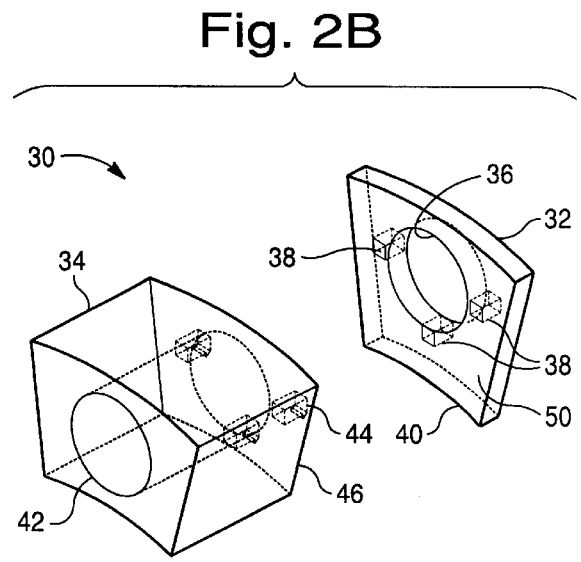
Fig. 2C
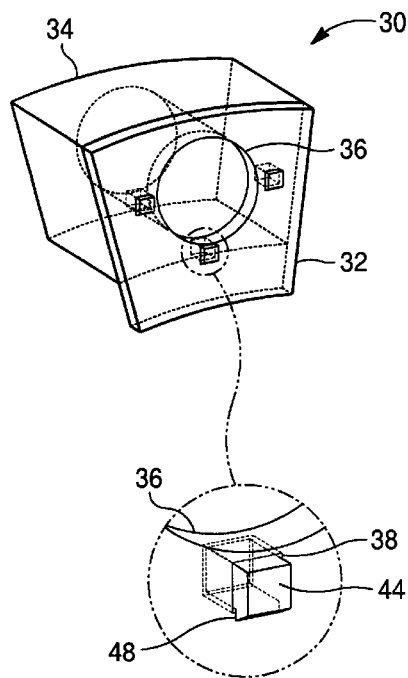
Fig. 2D
Fig. 2E
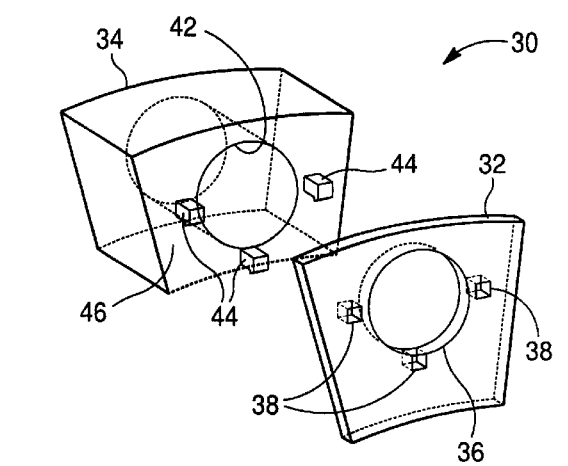

ANTI-LOCK BRAKE SENSOR HOLDER

BACKGROUND OF THE INVENTION

The invention is related to anti-lock brake sensors mounted on a vehicle axle, and more particularly to a holder for an anti-lock brake sensor.

Sensor brackets mounted to a vehicle axle are typically mounted to an axle to hold a sensor that monitors rotation of a wheel and compares rotation of the wheel hub to a referenced rotation. The sensor communicates with an anti-lock braking system, so that when the wheel is not rotating, the system determines that the wheel has been locked, and as a result the brakes can be released by the system. Sensor brackets have typically been fixed blocks welded to an axle which are provided with a receptacle for holding the sensor. These sensor brackets are typically machined or molded metal pieces capable of being welded, and are expensive to manufacture.

Most anti-lock braking systems utilize multiple anti-lock brake sensors, usually one at each end of an awe. Therefore a relatively large member of brackets are required, thus a reduction in manufacturing costs is desirable.

Accordingly, this invention provides an anti-lock brake sensor holder having a reduced manufacturing cost.

This invention further provides a sensor holder design which is capable of accommodating various sensors with minimal modification to a sensor holder.

This invention further provides a "universal" sensor holder which can be utilized in standard braking systems as well as reduced envelope brake systems, thereby providing common parts.

This invention further provides an anti-lock brake sensor holder which is releasably mounted to an axle housing to allow for part replacement and repairs.

These and other objects and features of the invention will be apparent from the following description and appended claims.

SUMMARY OF THE INVENTION

The invention provides a two-piece anti-lock brake sensor holding device having a bracket member with a mounting portion for mounting the bracket member to an axle housing of a wheel in a vehicle anti-lock brake system. A sensor holder has a holding portion for holding an anti-lock brake sensor. Attachment members for attaching the sensor holder to the bracket member are provided.

The attachment members allow the sensor holder to be releasably connected to the bracket member.

The bracket member is a sheet metal stamping and the mounting portion includes a mounting surface on the sheet metal stamping having a preformed shape which matches the shape of the axle housing.

The sensor holding device is provided with the attachment members which include at least one male part extending from either the sensor holder or the bracket member and a corresponding female part formed in the other of the sensor holder or the bracket member for each male part. The male part engages with the female part in a snap-fit engagement to attach the sensor holder to the bracket member.

The male part includes a protrusion having a lip portion on an outer end thereof and the female part includes an aperture or a recessed portion. The protrusion extends into the female part and the lip portion releasably connects the male part to the female part.

The invention further provides in a vehicle anti-lock brake system, a mounting device for an anti-lock brake sensor. The mounting device includes a mounting member welded to an axle housing, a sensor holder attached to the mounting member, an anti-lock brake sensor supported by the sensor holder, and attachment members for connecting the mounting member and the sensor holder.

The mounting member has an axle housing mounting surface which is shaped to fit against a mounting surface of the axle housing, and a sensor holder mounting surface positioned radially outward from the axle housing and the axle housing mounting surface.

The device has attachment members including a male part engaging with a female part in a snap-fit engagement to connect the sensor holder to the bracket member.

The male part can be integral with the sensor holder and the female part can be integral with the mounting member, and male part has a releasable engagement with the female part.

These and other features of the present invention can be best understood from the following specification.

BRIEF DESCRIPTION OF THE DRAWINGS

The invention will be more filly understood from the following detailed description and appended claims en taken with the drawings in which:

FIGS. 2a–2e depict first embodiment of a two-piece anti-lock brake sensor bracket according to the invention.

DETAILED DESCRIPTION OF THE INVENTION

Figure 1:
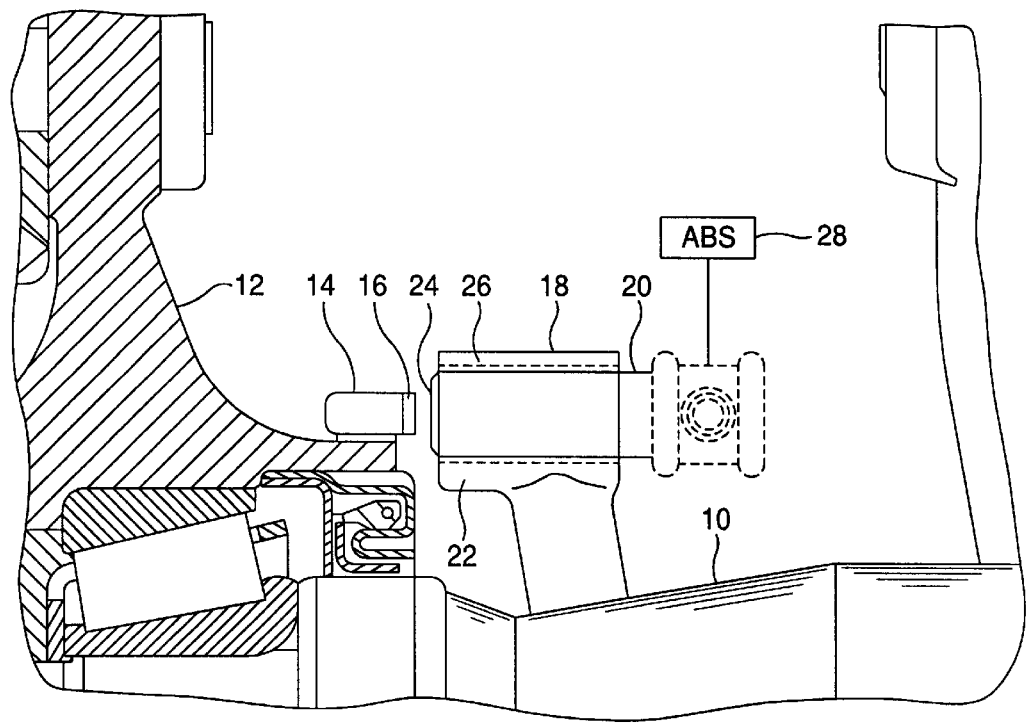
FIG. 1 is view of a portion of a vehicle axle and an anti-lock brake sensor mounted in a bracket according to the prior art.

Referring to FIG. 1, a typical axle assembly is shown. An axle housing 10 supports a wheel hub 12 mounted at one end of thereof which rotates relative to the axle housing 10. A tone ring 14 includes a plurality of circumferentially spaced serrations 16, only one of which is shown. A sensor bracket 18 is attached to the axle housing 10 for supporting an anti-lock brake sensor 20 which is mounted in a barrel portion 22 of the sensor bracket 18. The sensor 20 has a forward face 24 which monitors rotation of the wheel hub 12 by counting the rotation of the serrations 16 which rotate with the wheel hub 12. A bore 26 in the bracket barrel 22 mounts the sensor 20. The sensor 20 communicates with an anti-lock brake system 28 shown schematically to control the braking function of the wheel hub 12 according to the system requirements, as will be understood by those skilled in the art. Further it will be appreciated that the sensor depicted is exemplary and other types of sensors can be used with the present invention.

Now, referring to FIGS. 2a–2e, a first embodiment of the invention is depicted which is an improvement over the prior art shown in FIG. 1 as described hereinafter. A two piece bracket assembly 30 includes a first bracket member 32 and a second bracket member 34. The first bracket 32 member is constructed from a sheet metal stamping and in this first embodiment is shaped as a generally rectangular or trapezoidal flat member. The first bracket member 32 has a large central circular aperture 36 and three smaller square apertures 38 spaced about the circular aperture 36 which are stamped out during manufacturing. A bottom wall 40 of the first bracket member 32 has a curved configuration to fit against a cylindrical or frustoconical axle housing 10 such as that depicted in FIG. 1. The bottom wall 40 of the first bracket member 32 is welded to an axle housing when the two piece bracket assembly 30 is installed into the anti-lock braking system of a vehicle. The first bracket member is a mounting member for the second bracket member. Of course, it will be understood that the bottom wall 40 of the first bracket member 32 can be modified to accommodate the shape of the axle housing of a particular vehicle for the purpose of ensuring a secure fit between the bracket first member 32 and the axle housing during welding.

The second bracket member 34 of the first embodiment is a sensor holder which has a generally rectangular shape and a cylindrical bore 42 passing therethrough to support an anti-lock brake sensor therein. Three protrusions 44 are shown extending from a back wall 46 of the second bracket member 34. The protrusions 44 are generally square and are formed with a lip portion 48 at the outer end thereof The protrusions 44 cooperate with the three square apertures 38 in the first bracket member 32, such that when the back wall 46 of the second bracket member 34 is pressed against a front wall 50 of the first bracket member 32 with the central bore 36 and cylindrical bore 42 aligned, the protrusions 44 pass through the apertures 38 and the lip portions 48 snap-fit the two members 32, 34 together and thereby lock the two pieces together as can been seen in the exploded view of the snap-fit engagement of the two members in FIG. 2d. Of course it will be understood that the snap-fit engagement of the protrusions with the apertures can be achieved by modified configurations which are included within the scope of the invention.

In assembly of the two-piece bracket 30, such as in a typical axle assembly shown in FIG. 1, the first bracket member 32 is welded to the axle housing 10 to appropriately position the central bore 36 of the first bracket member 32 to face the wheel hub 12. The second bracket member 34 is snap-fit onto the first bracket member 32. A sensor 20 is mounted in the cylindrical bore 42. The snap-fit design of the two bracket members also provides a quick-disconnect design, allowing the second bracket member to be detached from the first bracket member by disengagement of the lip portions of the protrusions from the apertures. This two piece design of the bracket sensor 30 according to the invention can accommodate variations in tone wheel diameter and position with only minor modifications, as will be understood by those skilled in the art. Additionally, this design is "universal" in that the same type of two-piece bracket assembly works with reduced envelope brakes. Therefore, manufacturing and assembly costs are reduced.

Figure 3A:
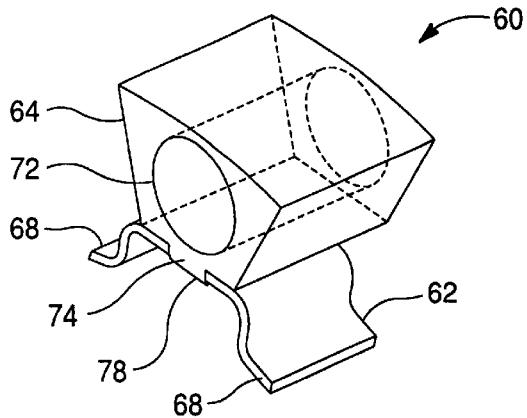
FIGS. 3a–3c depict a second embodiment of a two-piece anti-lock brake sensor bracket according to the invention.
Figure 3B:
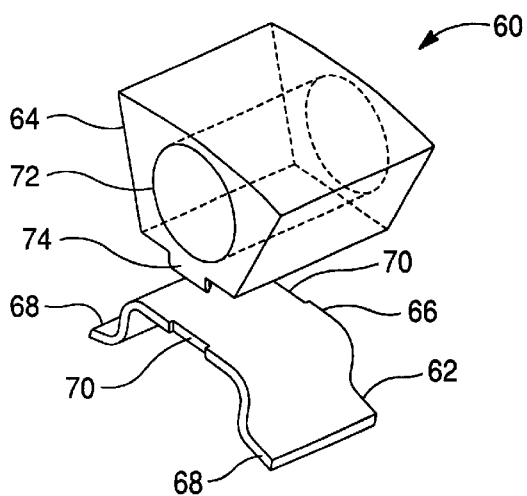
Figure 3C:
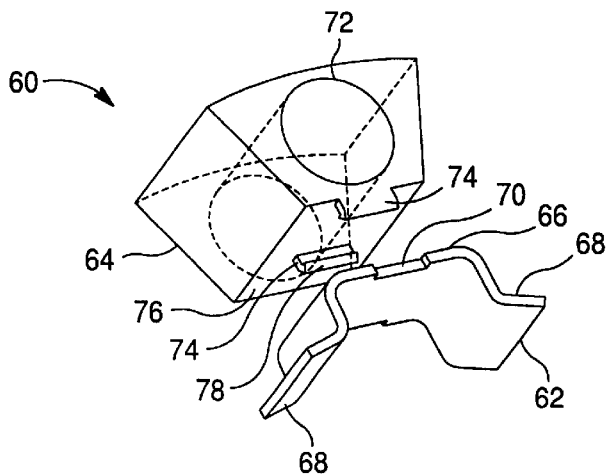

Referring to FIGS. 3a–3c, a second embodiment of the invention is shown which is an improvement over the prior art shown in FIG. 1 as described hereinafter. A two piece bracket assembly 60 includes a first bracket member 62 and a second bracket member 64. The first bracket member 62 is constructed from a generally rectangular sheet metal stamping and in this second embodiment is formed into a piece having an inverted U-shape portion 66 and two flanges 68 extending therefrom. The first bracket 62 member has two recessed portions 70 stamped out from the edges of the inverted U-shaped portion 66. The flanges 68 of the first bracket member 62 have an angled or arcuate configuration to fit against a cylindrical or frustoconical axle housing 10 such as that depicted in FIG. 1. The flanges 68 of the first bracket member 62 are welded to an axle housing when the two piece bracket assembly 60 is installed into the anti-lock braking system of a vehicle. The first bracket member is a mounting means for the second bracket member. Of course, it will be understood that of the first bracket member 62 can be modified to accommodate the shape of the axle housing of a particular vehicle for the purpose of ensuring a secure fit between the bracket first member 62 and the axle housing during welding.

The second bracket member 64 of the second embodiment is a sensor holder which has a generally rectangular or trapezoidal shape and a cylindrical bore 72 passing therethrough to support an anti-lock brake sensor therein. Two protrusions 74 are shown extending from the edges of a bottom wall 76 of the second bracket member 64. The protrusions 74 are generally rectangular and are formed with a lip portion 78 at the lower end thereof. The protrusions 74 cooperate with the two recessed portions 70 in the first bracket member 62, such that when the bottom wall 76 of the second bracket member 64 is pressed against a top wall 66 of the first bracket member 62, the protrusions 74 become flush with and engaged with the recessed portions 70 and the lip portions 78 snap-fit the two members 62, 64 together and thereby lock the two pieces together as shown in FIG. 3a. The snap-fit design of the two bracket members also provides a quick-disconnect design, allowing the second bracket member to be detached from the first bracket member by disengagement of the lip portions of the protrusions from the recessed portions. Of course it will be understood that the snap-fit engagement of the protrusions with the recessed portions can be achieved by modified configurations which are included within the scope of the invention.

In assembly of the two-piece bracket 60, such as in a typical axle assembly shown in FIG. 1, the first bracket member 62 is welded to the axle housing 10 to appropriately position the cylindrical bore 72 of the second bracket member 64 to face the wheel hub 12 when the two pieces are assembled. The second bracket member 64 is snap-fit onto the first bracket member 62. A sensor 20 is mounted in the cylindrical bore. This two piece design of the bracket sensor 60 according to the invention can accommodate variations in tone wheel diameter and position with only minor modifications, as will be understood by those skilled in the art. Additionally, this design is "universal" in that the same type of two-piece bracket assembly works with reduced envelope brakes. Therefore, manufacturing and assembly costs are reduced.

Figure 4A:
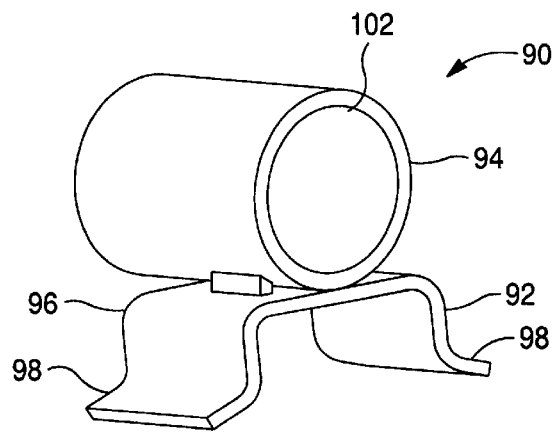
FIGS. 4a–4c depict a third embodiment of a two-piece anti-lock brake sensor bracket according to the invention.
Figure 4B:
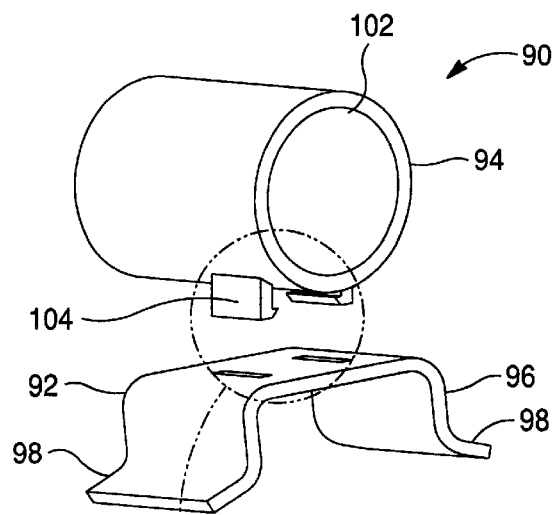
Figure 4C:
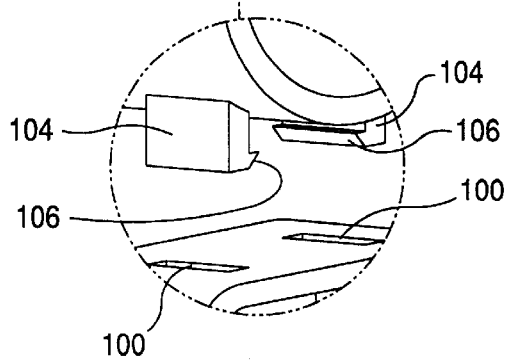

Referring to FIGS. 4a–4c, a third embodiment of the invention is shown which is an improvement over the prior art shown in FIG. 1 as described hereinafter. A two piece bracket assembly 90 includes a first bracket member 92 and a second bracket member 94. The first bracket member 92 is constructed from a generally rectangular sheet metal stamping and in this third embodiment is formed into a piece having an inverted U-shape portion 96 with two flanges 98 extending therefrom. The first bracket member 92 has two stamped out apertures 100 on a top side of the inverted U-shaped portion 96. The flanges 98 of the first bracket member 92 have an arcuate configuration to fit against a cylindrical or frustoconical axle housing 10 such as that depicted in FIG. 1. The flanges 98 of the first bracket member 92 are welded to an axle housing when the two piece bracket assembly 90 is installed into the anti-lock braking system of a vehicle. The first bracket member serves as a mounting member for the second bracket member. Of course, it will be understood that of the first bracket member 92 can be modified to accommodate the shape of the axle housing of a particular vehicle for the purpose of ensuring a secure fit between the bracket first member 92 and the axle housing during welding.

The second bracket member 94 of the third embodiment is a sensor holder which has a hollow cylindrical shape having a central cylindrical bore 102 passing therethrough to support an anti-lock brake sensor therein. Two protrusions 104 are shown extending from a bottom side of the second bracket member 94. The protrusions 104 are generally rectangular and are formed with a lip portion 106 at the lower end thereof The protrusions 104 cooperate with the two apertures 100 in the first bracket member 92, such that when the bottom side of the second bracket member 94 is pressed against a top wall of the first bracket member 92, the protrusions 104 pass through and engage the apertures 100 and the lip portions 106 snap-fit the two members 92, 94 together and thereby lock the two pieces together as shown in FIG. 4a. The snap-fit design of the two bracket members also provides a quick-disconnect design, allowing the second bracket member to be detached from the first bracket member by disengagement of the lip portions of the protrusions from the apertures. Of course it will be understood that the snap-fit engagement of the protrusions 104 with the apertures 100 can be achieved by modified configurations which are included within the scope of the invention.

In assembly of the two-piece bracket 90, such as in a typical axle assembly shown in FIG. 1, the first bracket member 92 is welded to the axle housing 10 to appropriately position the cylindrical bore 102 of the second bracket member 94 to face the wheel hub 12 when the two pieces are assembled. The second bracket member 94 is snap-fit onto the first bracket member 92. A sensor 20 is mounted in the cylindrical bore. This two piece design of the bracket sensor 90 according to the invention can accommodate variations in tone wheel diameter and position with only minor modifications, as will be understood by those skilled in the art. Additionally, this design is "universal" in that the same type of two-piece bracket assembly works with reduced envelope brakes. Therefore, manufacturing and assembly costs are reduced.

It will be understood by those skilled in the art that the protrusions and the apertures or recessed portions can be alternatively provided on the first or second bracket members, for example the protrusions 44 of the first embodiment could be located on the front wall 50 of the first bracket member 32 and recessed areas could be provided on the back wall 46 of the second bracket member 34 which could be designed to enable a snap-fit engagement with a releasable connection.

While the invention has been described with references to particular embodiments, the description is illustrative and is not to be construed as limiting the scope of the invention. Various modifications and changes may occur to those skilled in the art without departing from the spirit and scope of the invention as defined by the appended claims.

What is claimed is:

1. A two-piece anti-lock brake sensor holding device, comprising:

a bracket member having mounting means for mounting said bracket member to an axle housing of a wheel in a vehicle anti-lock brake system;

a sensor holder having holding means for holding an anti-lock brake sensor; and attachment means for attaching said sensor holder to said bracket member;

wherein said attachment means allows said sensor holder to be releasably connected to said bracket member, and wherein said bracket member is a sheet metal stamping and said mounting means includes a mounting surface of said sheet metal stamping having a preformed shape which matches the shape of the axle housing at respective mounting surfaces of said sheet metal stamping and the axle housing.

2. A two-piece anti-lock brake sensor holding device, comprising:

a bracket member having mounting means for mounting said bracket member to an axle housing of a wheel in a vehicle anti-lock brake system;

a sensor holder having holding means for holding an anti-lock brake sensor; and attachment means for attaching said sensor holder to said bracket member, wherein said attachment means allows said sensor holder to be releasably connected to said bracket member, and wherein said attachment means comprises at least one male part extending from one of said sensor holder or said bracket member and a corresponding female part formed in an other of said sensor holder or said bracket member for each male part, said male part engaging with said female part in a snap-fit engagement to attach said sensor holder to said bracket member.

3. The sensor holding device according to claim 2, wherein said male part comprising a protrusion having a lip portion on an outer end thereof and said female part comprising an aperture or a recessed portion, said protrusion extending into said female part and said lip portion releasably connecting said male part to said female part.

4. In a vehicle anti-lock brake system, a mounting device for an anti-lock brake sensor, comprising:

a mounting member welded to an axle housing;

a sensor holder attached to said mounting member;

an anti-lock brake sensor supported by said sensor holder; and attachment means for connecting said mounting member and said sensor holder;

wherein said attachment means comprises a male part engaging with a female part in a snap-fit engagement connecting said sensor holder to said mounting member.

5. The device according to claim 4, wherein said mounting member has an axle housing mounting surface which is shaped to fit against a mounting surface of said axle housing, and a sensor holder mounting surface positioned radially outward from said axle housing and said axle housing mounting surface.

6. The device according to claim 4, wherein said male part is integral with said sensor holder and said female part is integral with said mounting member, said male part having a releasable engagement with said female part.

* * * * *